(12) United States Patent
Kai (10) Patent No.: US 8,804,189 B2
(45) Date of Patent: Aug. 12, 2014

(54) DIVIDING IMAGE DATA INTO A PLURALITY OF PAGES FOR FAVORABLE READABILITY WHEN PRINTED

(71) Applicant: Brother Kogyo Kabushiki Kaisha, Nagoya (JP)

(72) Inventor: Takafumi Kai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 4 days.

(21) Appl. No.: 13/841,005

(22) Filed: Mar. 15, 2013

(65) Prior Publication Data

US 2014/0002830 A1    Jan. 2, 2014

(30) Foreign Application Priority Data

Jun. 29, 2012   (JP) ................. 2012-146385

(51) Int. Cl.
 *G06K 15/02* (2006.01)
 *G06F 3/12* (2006.01)

(52) U.S. Cl.
 CPC .............. *G06F 3/125* (2013.01); *G06F 3/1208* (2013.01); *G06F 3/1288* (2013.01); *G06F 3/1244* (2013.01)
 USPC ......................................... 358/1.2; 358/1.15

(58) Field of Classification Search
 CPC ...... G06F 3/1242; G06F 3/1244; G06F 3/125
 USPC .................................................. 358/1.2, 1.15
 See application file for complete search history.

(56) References Cited

U.S. PATENT DOCUMENTS

2008/0291492 A1 * 11/2008 Miyagi et al. ................ 358/1.15

FOREIGN PATENT DOCUMENTS

| JP | 2002-304274 A | 10/2002 |
| JP | 2007-150463 A | 6/2007 |

* cited by examiner

*Primary Examiner* — Eric A Rust

(74) *Attorney, Agent, or Firm* — Merchant & Gould PC

(57) ABSTRACT

An image processing system includes: a data receiving section configured to receive data in a first format from an image processing apparatus; a convert control section configured to control a converting section to convert the data in the first format to image data in another format different from the first format; an overall-image transmitting section configured to transmit the image data to the image processing apparatus; an area-information receiving section configured to receive an area info from the image processing apparatus; a partial-image generating section configured to generate partial-image data based on the area information; and a partial-image transmitting section configured to transmit one of the partial-image data and print data generated based on the partial-image data to one of the image processing apparatus and a printing apparatus.

15 Claims, 8 Drawing Sheets

Fig. 3A

DIVIDING IMAGE DATA INTO A PLURALITY OF PAGES FOR FAVORABLE READABILITY WHEN PRINTED

CROSS REFERENCE TO RELATED APPLICATION

The present application claims priority from Japanese Patent Application No. 2012-146385, filed on Jun. 29, 2012, the disclosure of which is incorporated herein by reference in its entirety.

BACKGROUND OF THE INVENTION

1. Field of the Invention

The present invention relates to an image processing system, an image processing apparatus, a method of image processing, and an image processing computer program.

2. Description of the Related Art

A printer server described in Japanese Patent Application Laid-open No. 2002-304274 generates an image data by converting a data such as web page acquired from an information processing terminal and having no page concept. Further, the printer server calculates the number of pages to be printed from the image data and generates print data corresponding to a print-page layout which has been set in advance for the calculated number of pages.

SUMMARY OF THE INVENTION

However, since the printer server described in Japanese Patent Application Laid-open No. 2002-304274 calculates automatically the number of pages to he printed, based on the image data which has been converted from the data having not page concept, there is a possibility of a page break at a position which is not intended by a user, In such a case, since a print result which is not intended by the user is achieved, readability of the print result is degraded. Whereas, in a case of page data having a page concept, page break is carried out at page separation set for each of pages. However, in a case that the page separation is at a position which is not intended by a user, since a print result which is not intended by the user is acquired, a readability of the print result is degraded.

The present invention has been made in view of the above-mentioned circumstances, and an Object of the present invention is to provide an image processing system which enables to achieve a print result with a favorable readability, an image processing apparatus, a method of image processing, and an image processing computer program.

According to a first aspect of the present invention, there is provided an image processing system configured to communicate with an image processing apparatus and a printing apparatus, including: a data receiving section configured to receive data in a first format from the image processing apparatus; a convert control section configured to control a converting section to convert the data in the first format received by the data receiving section to image data in another format which is different from the first format; an overall-image transmitting section configured to transmit the image data obtained by the converting section to the image processing apparatus; an area-information receiving section configured to receive an area information from the image processing apparatus, the area information being an information for dividing one image corresponding to the image data transmitted by the overall-image transmitting section into a plurality of pages; a partial-image generating section configured to generate partial-image data corresponding to a partial image obtained. by dividing the one image for each of the pages, based on the area information received by the area-information receiving section; and a partial-image transmitting section configured to transmit one of the partial-image data and print data generated based on the partial-image data to one of the image processing apparatus and the printing apparatus.

According to a second aspect of the present invention, there is provided a non-transitory computer readable storage medium storing computer-executable instructions that, when executed by a processor, cause an image processing apparatus configured to communicate with an image processing system configured to convert data in a first format to image data in another format different from the first format and with a printing apparatus, to: transmit the data in the first format to the image processing system; receive the image data converted from the data in the first format from the image processing system; display one image corresponding to the image data on a display section of the image processing apparatus; receive designation of a dividing position at which the one image displayed on the display section is divided into a plurality of pages via an operating section of the image processing apparatus; transmit, to the image processing system, an area information which indicates an area of each of the pages obtained by dividing the one image according to the designation of the dividing position, in a case that the designation of the dividing position has been received; receive, from the image processing system, one of partial-image data corresponding to a partial image obtained by dividing the one image based on the area information transmitted to the image processing system, and print data generated based on the partial-image data; and output, to the printing apparatus, one of the partial-image data received, print data generated from the partial-image data received, and the print data received.

It is possible to arrange the present invention in various aspects such as an image processing apparatus, a control unit which controls the image processing apparatus, a method of image processing, and a recording medium in which image processing computer program is recorded.

In the image processing system according to the first aspect, when the data of first format has been received from the image processing apparatus, the convert control section controls the converting section to convert the data of first format to the image data of a format which is different from the first format, and the acquired image data is transmitted to the image processing apparatus. On the other hand, in a case that the area information for dividing one image corresponding to the transmitted image data into the plurality of pages is received, the partial-image data corresponding to the image resulted from dividing the one image (partial image) is generated for each page based on the area information, The partial-image data which has been generated or the print data which has been generated based on the partial-image data is transmitted to the image processing apparatus or the printing apparatus. Therefore, it is possible to print each of the partial images based on the partial-image data on one recording paper. According to the image processing system according to the first aspect, since the partial-image data is generated based on the area information which has been received, by setting the area information upon dividing one image into the plurality of pages as intended by a user in the image processing apparatus, it is possible to achieve a print result having a favorable readability with a page-break as intended by the user.

According to the instructions stored in the computer readable recording medium according to the second aspect of the present invention, which are executable by the computer, in a case of having received the image data converted from the data of first type which has been transmitted to the image processing system, the image processing apparatus displays, on the display section, the one image based on the image data. In a case of having received an assigning of the dividing position at which the one image is divided from the operating section, the image processing apparatus transmits, to the image processing system, the area information indicating the area of each page which has been divided according to the dividing position assigned for the one image. Moreover, in a case of having received, from the image processing system, the partial-image data corresponding to the partial image which is an image divided based on the area information, or the print data which has been generated based on the partial-image data, the image processing apparatus outputs, to the printing apparatus, the partial-image data which has been received, the print data generated from the partial-image data received, or the print data which has been received. Therefore, it is possible to print each of the images based on the partial-image data (partial images) on one recording paper. Since the image processing apparatus receives, from the image processing system, the partial-image data which has been generated based on the area information corresponding to the dividing position assigned by the user; it is possible to achieve a print result having a favorable readability with a page-break at a dividing position as intended by the user.

BRIEF DESCRIPTION OF THE DRAWINGS

FIG. 2A, FIG. 23, FIG. 2C, FIG. 2D.

DETAILED DESCRIPTION OF THE PREFERRED EMBODIMENTS

Exemplary embodiments of the present invention will be described below while referring to the accompanying diagrams. To start with, a first embodiment of the present invention will be described below while referring to diagrams from FIG. 1 to FIG. 5B, A client 10 and an image processing system 500 are embodiments of an image processing apparatus and an image processing system respectively, according to the present invention. The image processing system 500 according to the first embodiment, which will be described later in detail, is formed as a system which is capable of achieving a print result with a favorable readability with a page-break carried out at a desired position for a print (printing) by the client 10 based on data with no page concept, such as HTML (HyperText Markup Language) data and data prepared by Excel (registered trademark) which is a spreadsheet software (hereinafter called as "Excel data").

Figure 1:
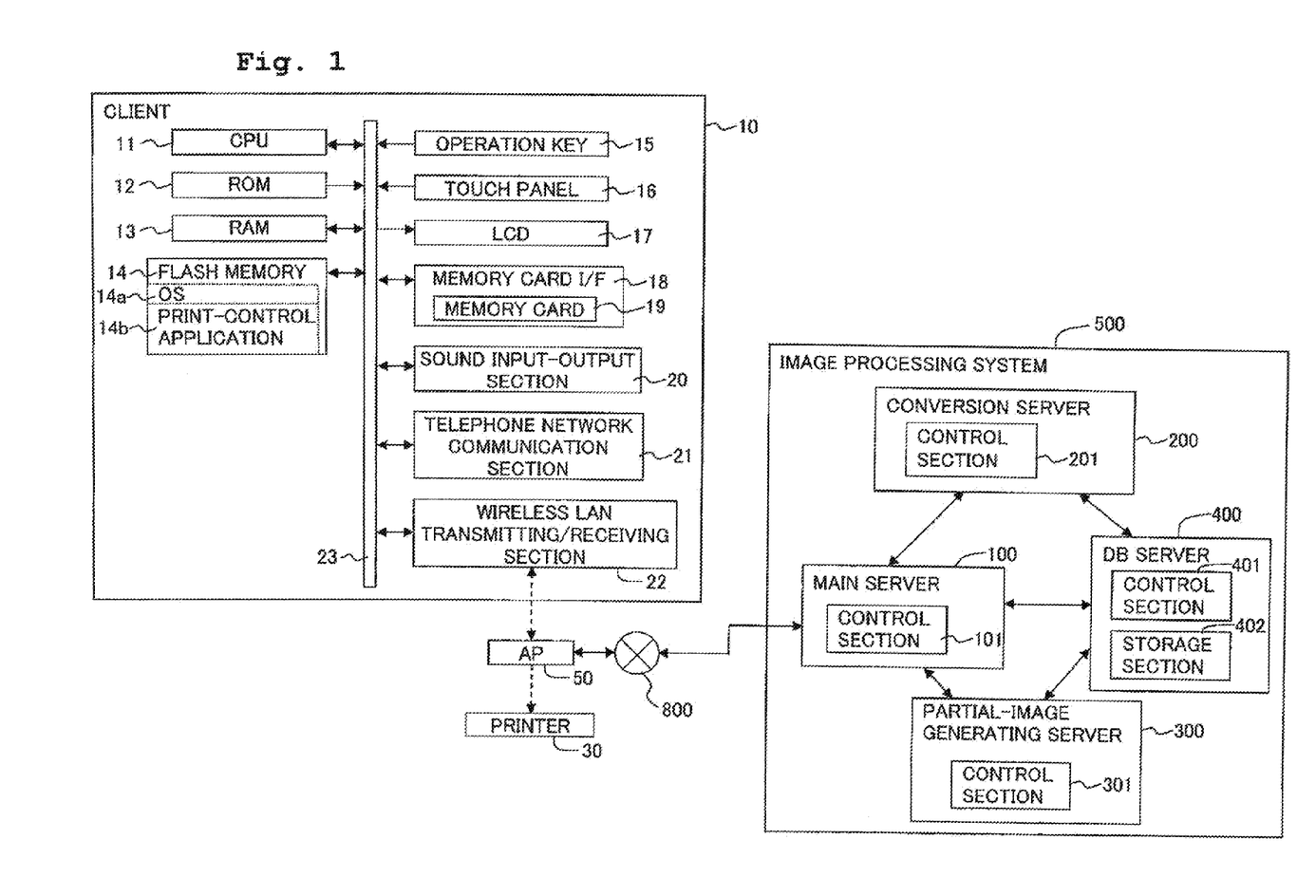
FIG. 1 is a block diagram showing a configuration of a client and an image processing system.

The client 10 according to the first embodiment is formed as a portable terminal such as a smartphone and a portable telephone. The client 10 is provided with a CPU (central processing unit) 11, a ROM (read only memory) 12, a RAM (random access memory) 13, a flash memory 14, an operation key 15, a touch panel 16, an LCD (liquid crystal display) 17, a memory card interface (memory card I/F) 18, a sound input-output section 20, telephone-network communication section 21, and a wireless LAN (local area network) transmitting/receiving section 22. All the sections provided to the client 10 are connected mutually via a bus line 23.

The CPU 11 controls each section connected to the bus line 23 according to fixed values and computer programs stored in the ROM 12. The ROM 12 is a non-rewritable non-volatile memory. The RAM 13 is a rewritable volatile memory. The flash memory 14 is a rewritable non-volatile memory. An operating system 14a (hereinafter, "OS 14a") and a print-control application 14b are stored in the flash memory 14. Here onward, the CPU 11 which executes computer programs such as an operating system and an application will be described only by a computer program name in some cases. For instance, the term "application" also means "the CPU 11 which executes the application" in some cases. The OS 14a is a basic software for realizing a standard function of the client 10, and in a case of the first embodiment, it is an Android (registered trademark) OS.

The print-control application 14b is an application provided by a vender of a device such as a multifunction device having a printer and a print function, which is to be installed in the client 10 by a user, and which enables the use of the device from the client. For instance, the print-control application 14b enables printing by a printer directly from the client 10 without going through a personal computer etc. Moreover, the flash memory 14 is provided with a print-setting memory (not shown in the diagram), in which various print settings such as a size of a printing paper (recording paper) are stored. The print-settings stored in the print-setting memory are variable, based on a predetermined operation by the user.

The operation key 15 is a mechanical key for inputting instructions etc. to the client 10, and is provided to a casing of the client 10. The touch panel 16 is provided to be overlapping with the LCD 17, and is used for inputting setting-information and instructions to the client 10. The LCD 17 displays various screens. The memory card I/F 18 is an interface which is installed on a memory card 19 which is non-volatile, and controls writing or reading of data with respect to the memory card 19. The sound input-output section 20 is a device for inputting and outputting sound and which includes a microphone and a speaker etc. The telephone-network communication section 21 is a circuit for carrying out conversation over telephone via a portable-telephone network (not shown in the diagram).

The wireless LAN transmitting/receiving section 22 communicably connects the client 10 and the printer 30 by a Wi-Fi (registered trademark) connection via an access point (AP) 50 which is an intermediary apparatus, by a wireless LAN conforming to IEEE 802.11b/g standard. Moreover, the wireless LAN transmitting/receiving section 22 communicably connects the client 10, and the image processing system 500 in the Internet 800 via the AP 50.

The image processing system 500 includes a main server 100, a conversion server 200, a partial-image generating server 300, and a database server (DB server) 400 (hereinafter, "servers 100 to 400"). The main server 100 is a server Which functions as a front-end in the image processing system 500. The main server 100 has a control section 101 which includes a CPU, a RAM, and a ROM which are not shown in the diagrams, an Internet communication section (not shown in the diagram), and a LAN communication section (not shown in the diagram). The main server 100 is communicably connected to the client 10 via the Internet 800 by an Internet communication section which is not shown in the diagram. Moreover, the main server is communicably connected to the conversion server 200, the partial-image generating server 300, and the DB server 400 by a LAN communication section which is not shown in the diagram.

The control section 101, in a case in which the main server 100 has received the Excel data from the client 10, as data to be printed, transmits the Excel data received to the DB server 400. Thereafter, in a case in which the main server 100 has received a conversion instruction from the client 10, the control section 101 transmits the conversion instruction to the conversion server 200, and converts the Excel data received, to image data In the following description, the Excel data is exemplified as data having no page concept, which is data to be printed. Moreover, in the following description, the image data which has been converted from the data to he printed (Excel data in the first embodiment) may also called as "overall-image data", and an image based on the overall-image data may also be called as an "overall image".

The control section 101, in a case of having received from the client 10, area information which indicates print areas which are resulted from dividing the overall image into a plurality of areas, transmits the conversion instruction including the area information to the partial-image generating server 300, and makes the partial-image generating server 300 generate image data corresponding to an image of each print area which has been divided based on the area information, out of the overall image corresponding to the area information. In the following description, the image of each print area which has been divided based on the area may also be called as a "partial image", and image data corresponding to the partial image may also be called as "partial-image data". Moreover, the control section 101, in a case of having received a download instruction for downloading the partial-image data from the client 10, transmits the download instruction to the DB server 400, and upon acquiring the partial-image data corresponding to the download instruction from the DB server 400, transmits to the client 10.

The conversion server 200 is a server which converts the Excel data to image data of a predetermined format such as JPEG (Joint Photographic Expert Group) format, The conversion server 200 has a control section 201 which includes a CPU, a ROM, and a RAM Which are not shown in the diagram, and a LAN communication section (not shown in the diagram), The conversion server 200 is communicably connected to the main server 100 and the DB server 400 by the LAN communication section which is not shown in the diagram. The control section 201, in a case of having received a conversion instruction from the main server 100, converts the Excel data acquired from the DB server to image data (overall-image data), and stores the acquired overall-image data in the DB server 400.

The partial-image generating server 300 is a server which generates partial-image data corresponding to the area information, from the overall-image data acquired by conversion by the conversion server 200. The partial-image generating server 300 has a control section 301 which includes a CPU, a ROM, and a RAM which are not shown in the diagram, and a LAN communication section (not shown in the diagram). The partial-image generating server 300 is communicably connected to the main server 100 and the DB server 400 by the LAN communication section which is not shown in the diagram. The control section 301, in a case of having received the conversion instruction including the area information from the main server 100, generates image data (partial-image data) corresponding to each print image resulted from dividing based on the area information, from among the partial images corresponding to the area information, and stores each partial-image data in the DB server 400.

The DB server 400 is a server which functions as a database which stores the Excel data which has been uploaded to the image processing system 500 from the client 10, the overall-image data which has been acquired by conversion by the conversion server 200, and the partial-image data which has been generated by the partial-image generating server 300. The DB server 400 has a control section 401 which includes a CPU, a ROM, and a RAM which are not shown in the diagram, a storage section 402 which includes a rewritable non-volatile memory such as a hard-disc drive, and a LAN communication section (not shown in the diagram). The DB server 400 is communicably connected to the LAN communication section which is not shown in the diagram, the main server 100, the conversion server 200, and the partial-image generating server 300. The control section 401, in a case of having received the Excel data, the overall-image data, or the partial-image data from the main server 100, the conversion server 200, or the partial-image generating server 300 respectively, stores the Excel data the overall-image data, or the partial-image data which have been received, in the storage section 402 upon associating with a conversion 11) which will be described later. Moreover, the control section 401, in a case of having received a download instruction for downloading the partial-image data from the main server 100, transmits partial-image data corresponding to the download instruction, to the main server 100.

The AP 50 is an intermediary apparatus which relays communication between Wi-Fi (registered trademark) terminals. Moreover, the AP 50 has a broadband router function, and can be connected to the Internet 800. The printer 30 is a printing apparatus which carries out printing on a printing paper, based on print data received from the client 10.

Figure 2A:
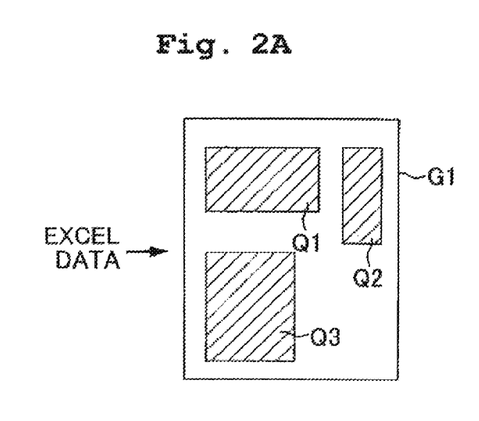

In a case that a print instruction for printing the Excel data is given by the user by using the print-control application 14b which. has been installed in the client 10, the Excel data is uploaded to the image processing system 500 from the client. Moreover, in the conversion server 200, the Excel data is converted to image data corresponding to one image (overall image) G1 as shown in FIG. 2A. In an example shown in FIG. 2A, the overall image G1 includes objects Q1, Q2, and Q3 (hereinafter, "objects Q1 to Q3") such as a table, a graph, and an image.

Figure 2B:
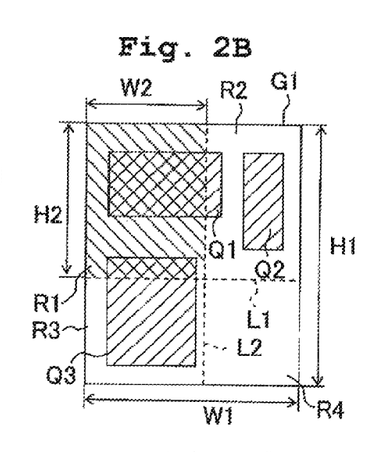

The image data (overall-image data) corresponding to the overall image G1 which has been converted in the image processing system 500 is stored in the DB server 400 and is also transmitted to the client 10. As the client 10 receives the overall-image data, the client 10 displays the image (overall image G1) corresponding to the overall-image data which has been received, on the LCD 17. At this time, in the overall image G1, separation lines L1 and L2 which divide the overall image G1 are displayed by superimposing as shown in FIG. 2B. The separation lines L1 and L2 are line segments which are displayed at page-separating positions which are calculated based on a ratio of a size of the overall image G1 and a size of the printing paper, which is stored in the print-setting memory (not shown in the diagram) of the flash memory 14. The page-separating positions are calculated based on the ratio of the size of the overall image G1 and the size of the printing paper, which is stored in the print-setting memory (not shown in the diagram) of the flash memory 14.

Concretely, in a case that a size in a vertical direction of the overall image G1 is H1 and a size in a vertical direction of the printing-paper size is H2, the CPU 11 arranges the number of page separations, which is derived by subtracting 1 from a value obtained by discarding digits after a decimal point in a quotient of (H1/H2), at a distance of H2 in a vertical direction from one end of the overall image G1. Whereas, in a case that a size in a horizontal direction of the overall image G1 is W1 and a size in a horizontal direction of the printing paper size is W2, the CPU 11 arranges the number of page separations, which is derived by subtracting 1 from a value obtained by discarding digits after a decimal point in a quotient (W1/W2), at a distance of W2 in a horizontal direction from one end of the overall image G1.

In an example in FIG. 2B, one page separation (separation line L1) is arranged in the vertical direction of the overall image G1, and one page separation (separation line L2) is arranged in the horizontal direction of the overall image G1. By the page separation lines L1 and L2, the overall image G1 is divided into four areas R1, R2, R3, and R4 (hereinafter, "areas R1 to R4"). The areas R1 to R4 divided by the separation lines L1 and L2 are set as print areas. In such manner, since the separation lines L1 and L2 (dividing lines) which divide the image into a plurality of pages according to the printing-paper size are displayed in the overall image G1, the user, in a case of dividing the overall image into the plurality of pages, is capable of dividing upon taking into consideration the printing-paper size.

Figure 2C:
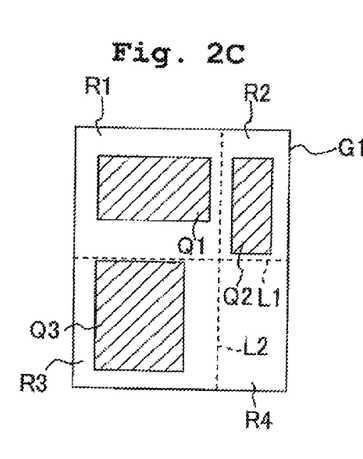

It is possible to move each of the separation lines L1 and L2 to a desired position on the overall image G1 by touching the separation line displayed on the LCD 17 by a finger and moving the finger in a desired direction. Therefore, it is possible to set the print areas into which the overall image G1 has been divided, in a range according to the user's desire. In FIG. 2C, a state, in which the separation lines L1 and L2 are moved such that each of the objects Q1 to Q3 in the overall image G1 is included in one respective print area, is exemplified. Since it is possible to set the desired print area by moving the separation lines L1 and L2, it is possible to set the print area freely and easily, thereby making it highly convenient.

The user inputs a print-execution instruction by a predetermined operation such as touching a print-execution button (not shown in the diagram) displayed on the LCD 17, after having moved the separation lines L1 and L2 to desired positions. As the print-execution instruction is input, area information indicating the areas R1 to R4 set as the print area is transmitted to the image processing system 500. The area information is formed by a plurality of coordinate information which enables to identify the print area which has been assigned by the user. For instance, the area information is formed by diagonal vertex coordinates, such as vertex coordinates of an upper-left corner and vertex coordinates of a lower-left corner in a rectangle forming each print area.

Figure 2D:
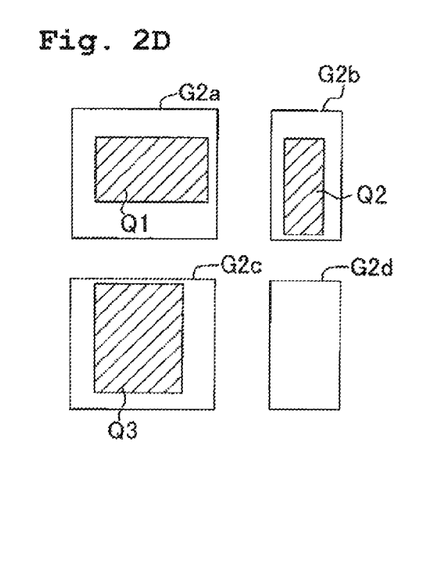

The partial-image generating server 300 in the image processing system 500, based on the area information (information of coordinates) which has been received, generates the partial-image data for the aforementioned portion, from the overall-image data corresponding to the overall image G1 stored in the DB server 400. For instance, partial-image data corresponding to images (partial images) G2a, G2b, G2c, and G2d (hereinafter, "images G2a to G2d") of the areas shown in FIG. 2D, is generated based on the areas R1 to R4 shown in FIG. 2C. The partial-image data which has been generated is transmitted to the client 10. In the first embodiment, the partial-image data which has been generated is transmitted to the client 10 after enlarging or reducing according to the printing-paper size.

Figure 2E:
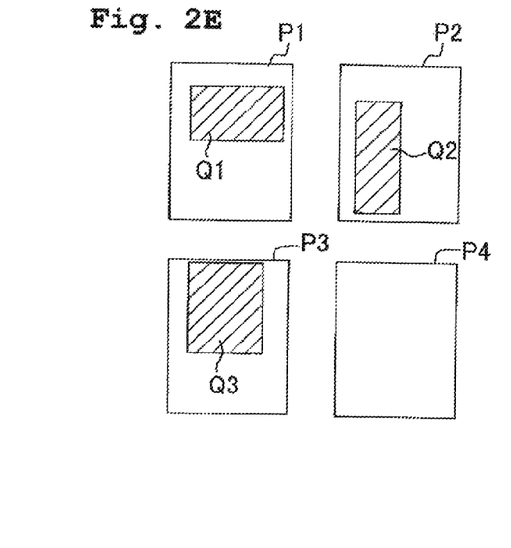
FIG. 2E (hereinafter, "FIG. 2A to FIG. 2E") are diagrams describing schematically an outline of the present invention.

As the client 10 receives the partial-image data, the client 10 generates print data corresponding to the partial-image data received, and transmits to the printer 30. As a result, images (partial images) of the areas R1 to R4 divided by the separation lines L1 and L2 shown in FIG. 2C are printed on printing papers P1, P2, P3, and P4 (hereinafter, "papers P1 to P4") respectively (FIG. 2E). As it has been mentioned above, in an example shown in FIG. 2C, the separation lines L1 and L2 are moved such that the objects Q1 to Q3 are included (accommodated) in the areas R1 to R3 respectively. Therefore, the objects Q1 to Q3 are printed without being disrupted, on the printing papers P1 to P3 respectively in an example shown in FIG. 2E, the print result of the printing paper P4 is a blank paper, and by making an arrangement which enables to specify the number of pages to he printed by the user, it is possible to make an arrangement such that printing of the fourth page is not carried out. Or, an arrangement may be made such that a partial-image data for which the print result is to become a blank paper is excluded from being subjected to printing.

As it has been mentioned above, the image processing system 500 converts the Excel data uploaded from the client 10, to the overall-image data, and also generates the partial-image data corresponding to the images (partial images) of the print areas, based on the area information. Meanwhile, the client 10 is capable of dividing the overall image which has been converted in the image processing system 50, to desired print areas by moving the separation lines which are displayed to be superimposed on the overall image. Therefore, the client 10, even without having a capacity to carry out processing of the Excel data, is capable of outputting from the printer 30 a print result having a. favorable readability with a page break at a desired position, by using the image processing system 500.

In FIG. 2B and FIG. 2C, examples, in which the overall image G1 is divided into the plurality of print areas by the separation lines L1 and L2 which are straight lines, have been shown. However, in the first embodiment, an arrangement has been made such that the overall image G1 can be divided into the plurality of areas by displaying rectangular frames according to the page separation, instead of the separation lines L1 and L2. In such a case, it is possible to set an area desired by the user as the print area by moving a position of a rectangular frame and/or by enlarging or reducing a size of the rectangular frame.

Figure 3A:
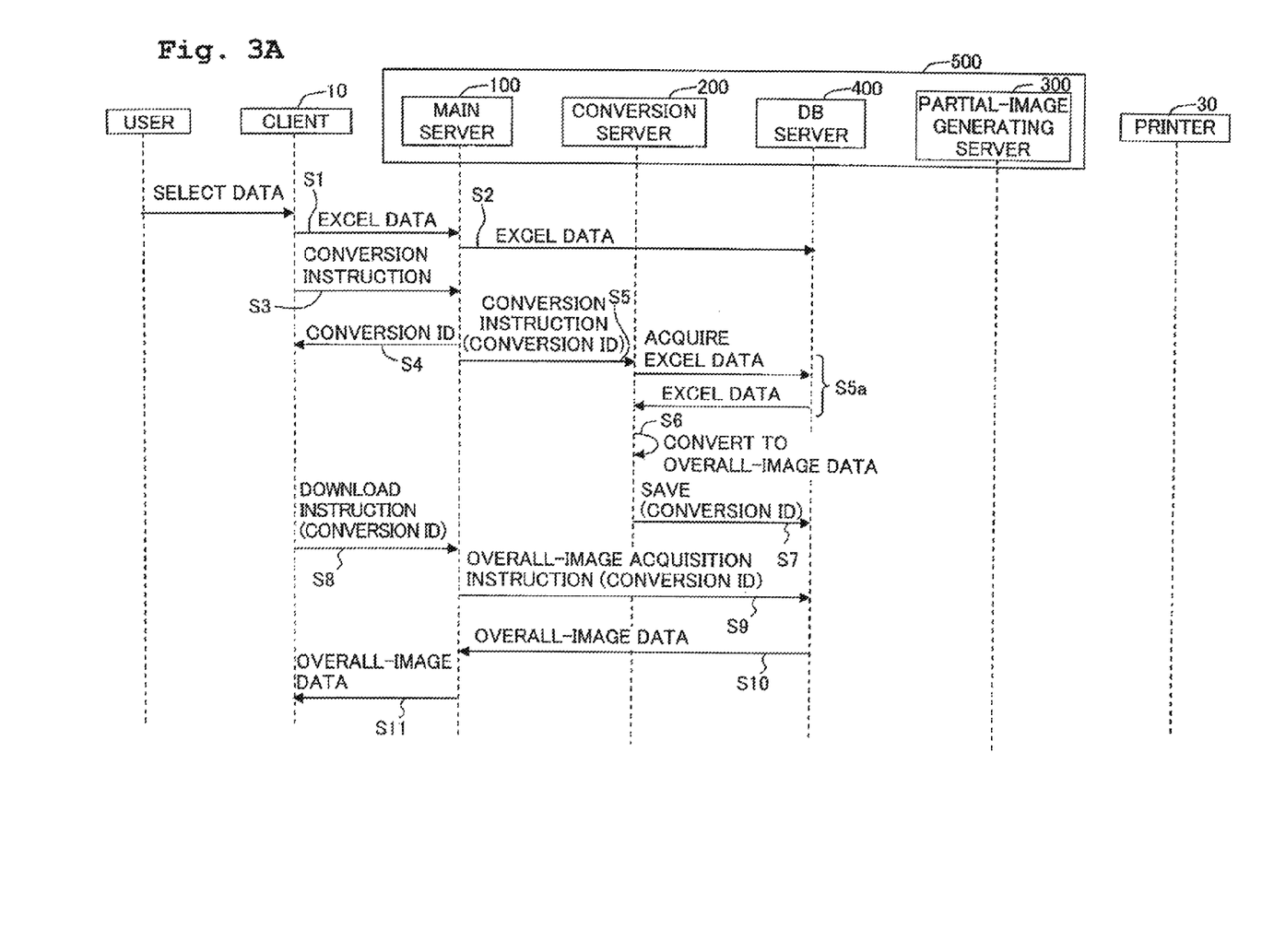
FIGS. 3A and 3B show a sequence diagram showing an image processing sequence.
Figure 3B:
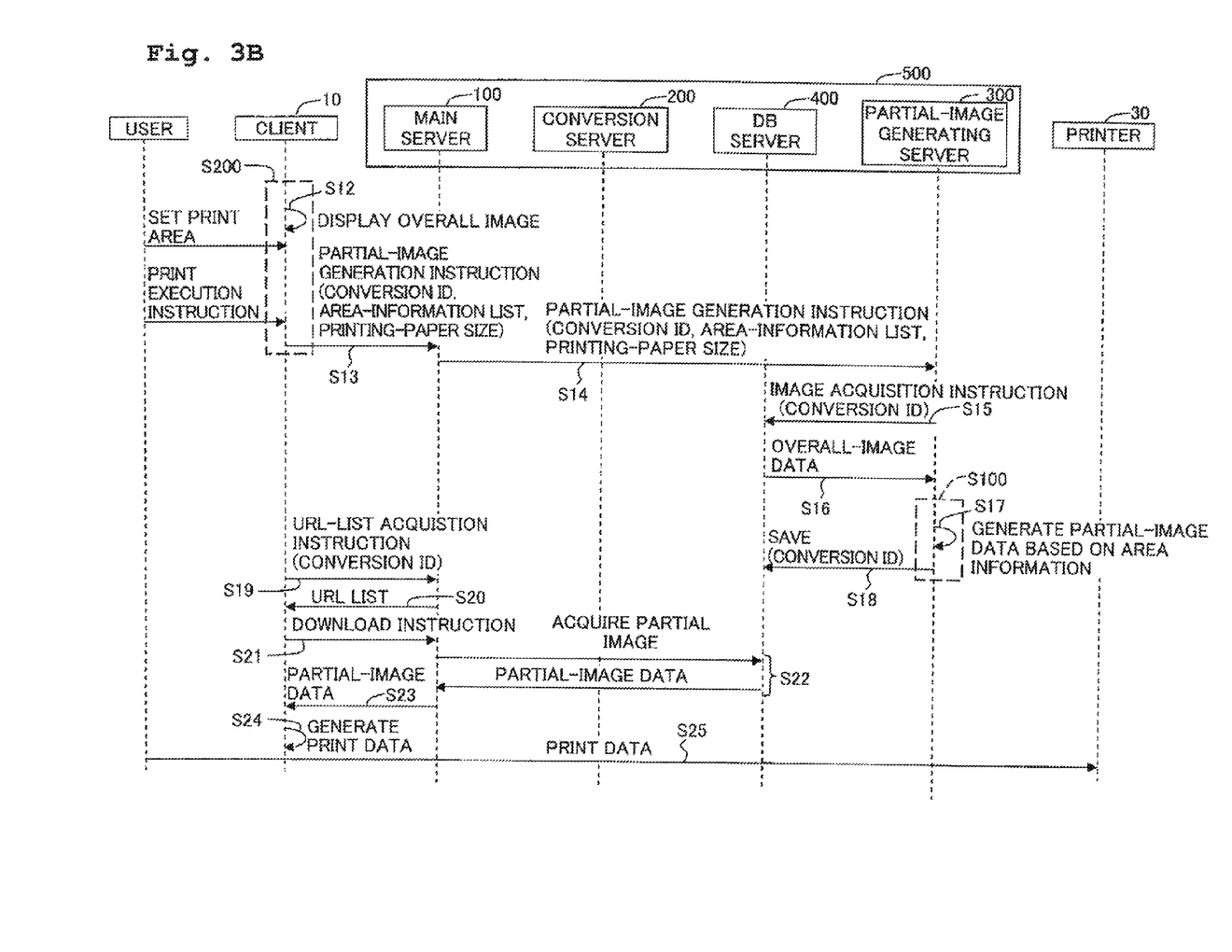

An image processing sequence Which is to be carried out between the client 10 and the image processing system 500 will be described below by referring to a sequence diagram in FIGS. 3A and 3B. Processing to be carried out by the CPU 11 of the client 10, and the control sections 101, 201, 301, and 401 of the servers 100, 200, 300, and 400 respectively is executed by a control program stored in each apparatus. For instance, processing to be carried out by the CPU 11 of the client 10 is executed by the print-control application 14b. In the following description, "the CPU 11 of the client 10" may also he called as only "client 10". Similarly, "the control section 101 of the main server 100", "the control section 201 of the conversion server 200", "the control section 301 of the partial-image generating server 300", and "the control section of the DB server 400" may also be called as "the main server 100", "the conversion server 200", "the partial-image generating server 300", and "the DB server 400" respectively. The Excel data may include a plurality of sheet data (data in which a plurality of cells are arranged in a lattice firm), but in the following description, for the sake of expediency, the Excel data is let to be formed by one sheet data.

In a case that the user has selected one Excel data desired to be printed as data to be subjected to printing, the client 10, at step S1, uploads the Excel data which has been selected, to the main server 100 of the image processing system 500 from the wireless LAN transmitting/receiving section 22. The Excel data which is to be subjected to printing may be data to be stored in any of the RAM 13, the flash memory 14, or the memory card 19. The Internet communication section of the main server 100 receives the Excel data which the client has transmitted at step S1. The main server 100 sets a conversion ID for the Excel data received, and transmits the Excel data and the conversion ID from the LAN communication section to the DB server 400 (step S2).

Moreover, the client 10 transmits a conversion instruction for converting the Excel data to image data, from the wireless LAN transmitting/receiving, section 22 to the main server 100 (step S3). The Internet communication section of the main server 100 receives the conversion instruction Which the client 10 has transmitted at step S2, The main server 100 transmits the conversion ID which has been set for the Excel data which is subjected to conversion at step S2, from the Internet communication section to the client 10 (step S4). Meanwhile, the main server 100 transmits conversion instruction including the conversion ID which has been set, from the LAN communication section to the conversion server 200 (step S5).

The conversion server 200 acquires from the DB server 400, the Excel data indicated by the conversion ID which is included in the conversion instruction (step S5a), and converts the Excel data which has been acquired to image data (overall-image data) of JPEG format (step S6). pup to the processing at step S6. for instance, the overall-image data corresponding to the overall image G1 shown in FIG. 2A is generated. The conversion server 200 associates the overall-image data acquired by the conversion with the conversion ID included in the conversion instruction which has been received from the main server 100, and stores in the storage section 402 of the DB server 400 (step S7).

Meanwhile, the client 10, in a case of having received the conversion ID from the main server 100, transmits a download instruction for downloading the overall-image data, from the wireless LAN transmitting/receiving section 22 to the main server 100 (step S8). The download instruction includes the conversion ID which has been received from the main server 100. The main server 100, in a case of having received the download instruction for downloading the overall-image data from the client 10, transmits an overall-image acquisition instruction, from the LAN transceiving section to the DB server 400 (step S9). The overall-image acquisition instruction includes the conversion ID which is included in the download instruction.

The DB server 400, in a case of having received the overall-image acquisition instruction from the main server 100, transmits from the LAN transceiving section, the overall-image data which is indicated by the conversion included in the overall-image acquisition instruction, to the main server 100 (step S10). The main server 100 transmits from the Internet communication section, the overall-image data received from the DB server 400 to the client 10 (step S11). The wireless LAN transmitting/receiving section 22 of the client 10 receives the overall-image data which the main server 100 has transmitted at step S11.

The client 10 displays an image (overall image) based on the overall-image data received from the main server, on the LCD 17 (step S12). The client 10, at step S12, displays the overall image as well as dividing lines (separation lines or rectangular frame) superimposed on the overall image on the LCD 17, and details thereof will be described later. Due to the processing at step S12, the overall image G1 and the separation lines L1 and L2 as shown in FIG. 2B are displayed on the LCD 17.

In a case that the user set (designated) the print area by operating the dividing lines which are displayed, and inputted the print-execution instruction to the client 10, the client 10 transmits a partial-image generation instruction from the wireless LAN transmitting/receiving section 22 to the main server 100 (step S13). The Internet communication section of the main server 100 receives the partial-image generation instruction which the client 10 transmitted at step S13. Detail processing which the client 10 carries out at steps S12 and S13 will be described later as a partial-image division processing (step S200) by referring to FIG. 4B.

The partial-image generation instruction which is transmitted from the client 10 at step S13 includes, the conversion ID corresponding to the overall image (overall-image data), a list of area information which indicates the print area which has been set by the user (hereinafter, the list of area information is called as "area-information list"), and the printing-paper size which is stored in the print-setting memory (not shown in the diagram) of the flash memory 14. The area-information list is formed as a list in which coordinate information which enables to identify each print area has been listed up. For instance, the user, in a case of having input the print-execution instruction at positions of the separation lines L1 and L2 shown in FIG. 2, area information which includes area information (coordinate information) of the print areas R1 to R4 which are set by the separation lines L1 and L2 is included in the area-information list.

The main server 100, in a case of having received the partial-image generation instruction from the client 10, transmits the partial-image generation instruction, from the LAN communication section to the partial-image generating server 300 (step S14). The partial-image generating server 300, in a case of having received the partial-image generation instruction from the main server 100, transmits an image acquisition instruction, from the LAN communication section to the DB server 400 (step S15). The image acquisition instruction includes the conversion ID which is included, in the partial-image generation instruction. The DB server 400, in a case of having received the image acquisition instruction from the main server 100, transmits the overall-image data which the conversion ID included in the image acquisition instruction indicates, from the LAN communication section to the partial-image generating server 300 (step S16).

The partial-image generating server 300, based on the area-information list which is included in the partial-image generation instruction, generates partial-image data corresponding to the print areas which have been set by the user, from the partial-image data received from the DB server 400 (step S17). At step S17, the partial-image data equivalent to the number of area information included in the area-information list is generated. For instance, based on the print areas R1 to R4 shown in FIG. 2C, partial-image data corresponding to the images G2a to G2d of the areas shown in FIG. 2D are generated. The partial-image generating server 300 associates the partial-image data which has been generated, with the conversion ID included in the partial-image generation instruction, and stores in the storage section 402 of the DB server 400 (step S18). Detail processing which the partial-image generating server 300 carries out at steps S17 and S18, will be described later as partial-image generation processing (step S100) by referring to FIG. 4A.

The client 10 transmits an acquisition request for acquiring a least of URL (hereinafter, the list is called as a "URL list") which indicates a destination to store each partial-image data in the DB server 400, from the wireless LAN transmitting/receiving section 22 to the main server 100 (step S19). The acquisition request for the ULR list includes a conversion ID corresponding to the partial-image data which is an origin of the partial-image data. The main server 100, in a case of having received the acquisition request for the URL list from the client 10, transmits the URL list indicating the conversion ID included in the acquisition, from the Internet communication section to the client 10 (step S20). The client 10 transmits a download instruction for the partial-image data from the wireless LAN transceiving section 15 to the main server 100 (step S21). The download instruction at step S21 is an instruction for downloading the partial-image data from each URL in the URL list.

The main server 100, in a case of having received an instruction for downloading the partial-image data from the client 10, acquires the partial-image data from each URL of the storage section 402 of the DB server 400, based on the download instruction (step S22). The main server 100 transmits the partial-image data acquired from the DB server 400, from the Internet communication section to the client 10 (step S23). The wireless LAN transmitting/receiving section 22 of the client 10 receives the partial-image data which the main server 100 transmitted at step S23.

The client 10 generates print data based on the partial-image data received from the main server 100 (step S24). Next, the client 10 transmits the print data which has been generated, to the printer 30 (step S25). The printer 30 prints an image based on the print data received from the client 10. For instance, images of the areas R1 to R4 which have been divided by the separation lines L1 and L2 shown in FIG. 2C are printed on the printing papers P1 to P4 respectively.

The download instruction at step S21 may be a download instruction for each of the partial-image data generated at step S17, or may be a download instruction which is intended for all the partial-image data generated at step S17. In the former case, processing at steps from S22 to S25 is carried out sequentially (one after another) for one partial-image data at a time. In the latter case, in one processing at steps from S22 to S25, all the partial-image data is subjected to processing collectively.

Moreover, in a case that the Excel data is formed by a plurality of sheet data, as the conversion server 200 receives a conversion instruction from the main server 100 at step S5, the conversion server 200 converts the Excel data to the one overall-image data for each sheet data. In other words, the overall-image data equivalent to the number of sheet data included in the Excel data is generated. Moreover, the conversion server 200 carries out the processing at steps from S7 to S25 for each overall-image data.

The partial-image generation processing (step S100) mentioned above will be described by referring to a flowchart in FIG. 4A. As it has been mentioned above, the partial-image generation processing is a processing which the control section 301 of the partial-image generating server 300 executes according to a control program (not shown in the diagram). The control section 301 acquires area information of a first area from the area-information list (step S101). Next, the control section 301 generates partial-image data of the portion by trimming, from the overall-image data, based on the area information, or more elaborately, based on the coordinate information which forms the area information (step S102).

Next, the control section 301 enlarges or reduces the partial-image data generated, according to the printing-paper size (step S103). Concretely, at step S103, the control section 301 compares a size of the partial image based on the partial-image data which has been generated, and the printing-paper size, and in a case in which the partial image based on the partial-image data is not accommodated in the printing-paper size, the control section 301 reduces the partial-image data size such that the partial image is accommodated on the printing paper. Whereas, in a case in which the size of the partial image is not larger than a predetermined proportion such as 60% with respect to the printing-paper size, the control section 301 enlarges the partial-image data so that the partial image does not spread out of the printing paper. By the processing at step S103 being executed, it is possible to print each partial image with a size having a favorable visibility on the printing paper.

Next, in a case in which there is area information which is not subjected to processing in the area-information list (Yes at step S104), the control section 301 acquires area information of the subsequent area from the area-information list (step S105), and returns the processing to step S102. Whereas, in a case in which there is not area information which is not subjected to processing in the area-information list (No at step S104), the control section 301 stores the partial-image data which has been generated, in the storage section 402 of the DB server 400 (step S106), and terminates the processing.

Next, the overall-image division processing (step S200) which has been mentioned above will be described by referring to a flowchart in FIG. 4B. As it has been mentioned above, the overall-image division processing is a processing which the CPU 11 of the client 10 executes according to the print-control application 14*b*. The CPU 11 displays the overall image based on the overall-image data received from the main server 100, on the LCD 17 (step S201). Next, the CPU 11 calculates page separations based on a ratio of a size of the overall image and the printing-paper size stored in the print-setting memory (not shown in the diagram) of the flash memory 14 (step S202).

Next, the CPU 11 makes a judgment of whether a display mode is a separation-line mode or a rectangular-frame mode (step S203). The separation-line mode is a mode of displaying areas which are divided by page break, by displaying separation lines corresponding to page break which has been calculated at step S202, as dividing lines. Whereas, the rectangular-frame mode is a mode of displaying a rectangular frame which. surrounds areas divided by page break calculated at step S202, as dividing lines. The client 10 is arranged to be capable of selecting either the separation-line mode or the rectangular-frame mode as the display mode, based on a predetermined operation by the user.

In a case in which the CPU 11 has made a judgment that the display mode is separation-line mode at step S203 (step S203: separation line), the CPU 11 displays the separation line at a position of page break, by superimposing on the overall image (step S204). By the processing at step S204, a display shown in FIG. 2B for example, is displayed on the LCD 17. In a case in which the CPU 11 has received an instruction to move with respect to the separation line which has been displayed, based on an operation of the touch panel 16 by the user (Yes at step S205), the CPU 11 moves the separation line according to the instruction received (step S206), and shifts the processing to step S207. By the processing at step S206, a display shown in FIG. 2C for example, is displayed on the LCD 17.

Whereas, in a case in which the CPU 11 has made a judgment that the display mode is rectangular-frame mode, at step S203 (step S203: rectangular frame), the CPU 11 displays the rectangular frame which surrounds the areas divided by page separation, by superimposing on the overall image (step S209). In a case in which the CPU 11 has received an instruction for changing a size, or a movement with respect to the rectangular frame which has been displayed, based on an operation of the touch panel 16 by the user (Yes at step S210), the CPU 11, according to the instruction received, changes the size or position of the rectangular frame (step S211), and shifts the processing to step S207. For instance, by arranging the rectangular frame along an outer edge of the object Q1 (FIG. 2A), it is possible to set the object Q1 only, as a print area.

In other words, in a case in which the user has given an instruction for moving the separation line or changing the rectangular frame, the CPU 11 executes processing at step S206 or processing at step S211. Therefore, the user is capable of setting a desired range out of the overall image, as a print area. Whereas, in a case in which the CPU 11 has not received the instruction for moving the separation line (No at step S205), or, in a case in which the CPU 11 has not received the instruction for changing the rectangular frame (No at step S210), the CPU shifts the processing to step S207.

In a case in which the CPU 11 has received the print-execution instruction based on an operation on the touch panel 16 by the user at step S207 (Yes at step S207), the CPU 11 transmits the partial-image generation instruction from the wireless LAN transmitting/receiving section 22 to the main server 100 (step S208), and terminates the processing. Whereas, in a case in which the CPU 11 has not received the print-execution instruction (No at step S207), the CPU 11, in a case in which the display mode is separation-line mode (step S212: separation line), shifts the processing to step S205, and in a case in which the display mode is rectangular-frame mode (S212: rectangular frame), shifts the processing to step S210.

According to the image processing system 500 of the first embodiment described above, the Excel data which has been received as data subjected to printing from the client 10 is converted to the overall-image data, and the overall-image data achieved after conversion is transmitted to the client 10. Moreover, based on the area information received from the client 10, the partial-image data corresponding to the images (partial images) which have been divided based on the area information, out of the partial-image corresponding to the partial-image data is generated for each page, and the partial-image data which has been generated is transmitted to the client 10. Accordingly, it is possible to print each partial image based on the partial-image data, on one printing paper. In other words, since the partial-image data is generated based on the area information received from the client, by setting the area information upon dividing one overall image into a plurality of pages as intended by the user, in the client 10, it is possible to achieve a print result having a favorable readability with a page break as intended by the user.

Moreover, according to the image processing system 500, the overall-image data acquired by the conversion by the conversion server 200 is stored in the DB server 400 upon associating with the conversion ID. Therefore, even at any timing thereafter, in a case in which the partial-image generation instruction including the area information and the conversion ID is received, it is possible to generate the partial-image data from the area information, from the overall-image data which is stored in the DB server 400 upon being associated with the conversion ID. In other words, if the user, upon converting the Excel data to the overall-image data in advance, transmits the partial-image generation instruction to the image processing system at a convenient timing thereafter, it is possible to print a partial image of a desired printing area.

Moreover, according to the client 10 of the first embodiment, after the partial-image data has been converted upon uploading the Excel data to the image processing system 500, since it is possible to receive from the image processing system 500, the partial-image data which has been generated based on the area information corresponding to the dividing position specified by the user, it is possible to achieve a print result having a favorable readability with a page break at a dividing position intended by the user. Moreover, even in a case of a situation in which the client 10 has no capacity of processing the Excel data, or a situation in which the client 10 being in the midst of executing the processing is not able to carry out processing of the Excel data, by making the image processing system 500 carry out processing of the Excel data, the user is capable of achieving a print result with an intended page break. Moreover, since the area information which is transmitted from the client 10 to the image processing system 500 is not image data but coordinate information, it is possible to suppress the communication time to be short.

Next, a second embodiment of the present invention will be described below by referring to FIG. 5A. In the first embodiment, an arrangement was let to be such that each partial-image data is enlarged or reduced according to the printing-paper size. However, in the second embodiment, each partial-image data is enlarged or reduced by a common enlargement ratio. In the second embodiment, same reference numerals are assigned to components which are same as in the first embodiment, and description thereof is omitted.

A partial-image generation processing (step S100) according to the second embodiment is also a processing which is executed by the control section 301 of the partial-image generating server 300 according to a control program (not shown in the diagram) similar to the first embodiment. The control section 301 executes processing at steps S101 and S102 similarly as in the first embodiment, In a case in Which there is area information which has not been subjected to processing in the area-information list (Yes at step S104), the control section 301 executes the processing at step S105 similar to the first embodiment, and returns the processing to step S102.

Whereas, in a case in Which there is no area information which has not been subjected to processing in the area-information list (No at step S104), the control section 301 determines the common enlargement ratio based on a partial image of the maximum size, from among the partial images corresponding to the partial-image data which has been generated (step S121). Concretely, at step S301, the control section 301 compares the size of the largest partial image and the printing-paper size, and in a case in which the partial image is not fitted in the printing paper, the control section 301 determines the enlargement ratio having a negative value, such that the partial image is fitted in the printing paper. Whereas, in a case in which the size of the largest partial image is not larger than a predetermined proportion such as 60% with respect to the printing-paper size, the control section 301 determines the enlargement ratio having a positive value, so that the enlarged partial image does not spread out of the printing paper. Next, the control section 301 enlarges or reduces all the partial-image data by an enlargement ratio which has been determined (step S122), and stores the partial-image data generated, in the storage section 402 of the DB server 400 (step S106), thereby terminating the processing.

According to the second embodiment described above, since each partial-image data is enlarged or reduced by the enlargement ration which has been determined based on the size of the largest partial image, in a case in which each partial-image data includes characters and common symbols etc. it is possible to make uniform the size of characters and common symbols in a print result of each page. Therefore, it is possible to achieve a reasonable print result with no strange feeling.

Next, a third embodiment of the present invention will be described below by referring to FIG. 5B. In the first embodiment, an arrangement was let to be such that, the dividing lines are set automatically corresponding to the printing-paper size. However, in the third embodiment, the user sets a dividing line at an arbitrary position. In the third embodiment, same reference numerals are assigned to components which are same as in the first embodiment, and description thereof is omitted.

A partial-image generation processing (step S200) according to the third embodiment is also a processing which is executed by the CPU 11 of the client 10 according to the print-control application 14b, similar to the first embodiment.

The CPU 11 executes the processing at step S201 similar to the first embodiment. In a case in which the CPU 11 has received an addition of separation lines based on art operation on the touch panel 16 (Yes at step S221), the CPU 11 displays the separation lines added, by superimposing on the overall image (step S222), and executes processing at steps S205 and S206 similar to the first embodiment. The separation lines are added by the user drawing straight lines by touching desired positions on the overall image by a finger. Whereas, in a case in which the CPU 11 has not received the addition of separation lines (No at step S221), the CPU 11 shifts the processing to step S205. In a case in which the CPU 11 has received the print-execution instruction based en an operation on the touch panel 16 by the user (Yes at step S207), the CPU 11, similar to the first embodiment, executes the processing at step S208, and terminates the processing. Whereas, in a case in which the CPU 11 has not received the print-execution instruction, the CPU 11 shifts the processing to step S205.

According to the third embodiment mentioned above, the user can set a separation line at an arbitrary position. Therefore, since it is possible to set a desired separation line at a desired position, it is possible to set the print area freely and easily, thereby making it highly convenient. In the third embodiment, an arrangement has been made such that it is possible to set the separation line arbitrarily. However, the arrangement may be let to be such that it is possible for the user to set the rectangular frame arbitrarily.

In the first embodiment, the second embodiment, and the third embodiment described above (hereinafter, "the embodiments described above"), the image processing system 500 is an example of an image processing system according to the present invention. The client 10 is an example of an image processing apparatus. The print-control application 14b is an example of an instruction which is executable by a computer. The conversion server 200 is an example of a converting section. The DB server 400 is an example of a storage section. The printer 30 is an example of a printing apparatus. The CPU 11 is an example of a computer. The LCD 17 is an example of a display section. The touch panel 16 is an example of an operating section. The processing at step S1 is an example of a processing by a data receiving section and a data transmitting section. The processing at step S6 is an example of a processing by the converting section. The processing at step S11 is an example of a processing by an overall-image transmitting section and an overall-image receiving section. The processing at step S13 is an example of a processing by an area-information receiving section and an area-information transmitting section. The processing at step S100 is an example of a processing by a partial-image generating section. The processing at step S23 is an example of a processing by a partial-image transmitting section and a partial-image receiving section. The processing at step S13 is an example of a processing by a size acquiring section. The processing at steps S205 and S210 is an example of a processing by a dividing-position receiving section. The processing at step S25 is an example of a processing by a print control section.

Although the present invention has been described based on the embodiments described above, the present invention is not restricted to the embodiments described above, and it is readily inferable that various modifications without departing from the scope of the present invention are possible.

For instance, in each of the abovementioned embodiments, the image processing system 500 has been formed as a system including the main server 100, the conversion server 200, the partial-image generating server 300, and the DB server 400. However, the image processing system 500 may be formed as a system in which one server has functions of the servers 100 to 400. Moreover, in the embodiments described above, communication by the LAN communication section has been exemplified as a communication among the servers 100 to 400. However, the communication may be by the Internet communication section of each of the servers 100 to 400.

In the embodiments described, above, the Excel data has been exemplified as data subjected to printing. However, the present invention is also applicable to other data having no page concept, such as HTML data. Moreover, the present invention is also applicable to page data having page concept, such as PDF (Portable Document Format). Moreover, an arrangement has been made such that the conversion server 200 converts the data subjected to printing to the image data of PEG format. However, the format of the data after conversion is not restricted to JPEG format, and various formats such as PNG (Portable Network Graphics), GIF (Graphics Interchange Format), and BMP (Bitmap) can also be adopted.

In the embodiments described above, a portable terminal having a communication function has been exemplified as the client 10 in which the print control application 14b is installed. However, various apparatuses such as, a digital camera and a tablet having the communication function may become an example of the client 10. Moreover, the present invention is also applicable to an apparatus which does not have the touch panel 16, and in which an operation is inputted by mechanical keys. Moreover, in the embodiments described above, the description has been made assuming that the OS 14a is an Android (registered trademark). However, the present invention is also applicable even in a case in which another OS has been installed.

In the embodiments described above, an arrangement has been made such that the client 10 is an apparatus which does not have a print function. However, an arrangement may such that a printing apparatus, in which the print control application 14b has been installed, is let to be the client 10. The printing apparatus may be a multifunction device having the print function or a printer having only the print function. In such a case, in a case of the client 10 having received the partial-image data from the image processing system 500, the client 10 transmits an image based on the partial-image data which has been received, to a print section of the client 10, and is capable of printing by the print function.

In the embodiments described above, an arrangement has been made such that the image processing system 500 transmits to the client 10, the partial-image data generated by the partial-image generating server 300. However, an arrangement may be made such that the image processing system 500 generates print data based on the partial-image data generated by the partial-image generating server 300, and transmits the print data to the client 10. In such a case, the print data may be generated after the partial-image data has been generated, by the partial-image generating server 300 at step S17, or may be generated in a case in which the main server 100 has acquired the partial-image data from the DB server 400, at step S22.

In the embodiments described above, an arrangement has been made such that the client 10 transmits the print data based on the partial-image data to the printer 30. However, an arrangement may be made such that the partial-image data is transmitted to the printer 30, and the printer 30 is made to carry out printing based on the partial-image data. Moreover, in the embodiments described Above, an arrangement has been made such that the image processing system 500 transmits the partial-image data to the client 10, and transmits the print data corresponding to the partial-image data to the printer 30 from the client 10. However, an arrangement may be made such that the image processing system 500 transmits to the printer 30, the partial-image data. or the print data corresponding to the partial-image data, and makes the printer 30 print an image.

In the embodiments described above, an arrangement has been made such that the image processing system 500 transmits the overall-image data which has been converted from the Excel data in the conversion server 200 with a grade as it is, to the client 10. However, an arrangement may be made such that the overall-image data is transmitted to the client 10 after lowering the grade. Lowering the grade means to make a data-size small by compressing the overall-image data, or to lower resolution of the overall-image data. Since the overall-image data is data which is transmitted for setting the print area in the client 10, it is not required to be of a high grade, and by transmitting to the client after lowering the grade, it is possible to shorten the time required for transmitting the overall-image data. In this case, an arrangement may be made such that, at step S6, when the conversion server 200 has converted the Excel data. to the overall-image data, second overall-image data which is resulted by lowering the grade of the overall-image data, is generated, and both the overall-image data and the second overall-image data are stored in the DB server 400 upon associating with the conversion ID. Moreover, an arrangement may be made such that, at step S8, in a case in which there has been a download instruction from the client 10, the corresponding second overall-image data is transmitted from the DB server 400. In this case, the processing at step S6 is an example of a low-grade image generating section. Or, an arrangement may be made such that in a case in which there has been a download instruction from the client 10, at step S11, the main server 100, after lowering the grade of the overall-image data received from the DB server 400, transmits the overall-image data having the grade lowered, to the client 10. In this case, the processing at step S11 is an example of a low-grade image generation. Or, an arrangement may be made such that, without lowering the grade of the overall-image data, at step S6, the conversion server 200, at the time of converting the Excel data to the overall-image data, converts to image data of low grade. In this case, the processing at step S6 is an example of a low-grade image generating section.

In the embodiments described above, an arrangement has been made such that, at step S3, the conversion instruction is transmitted from the client 10 to the image processing system 500. However, an arrangement may be made such that the transmission of the conversion instruction is omitted. In this case, an arrangement may be made such that, in a case that the conversion server 200 has received the Excel data, the conversion server 200 converts the Excel data to image data for each sheet data.

Figure 4A:
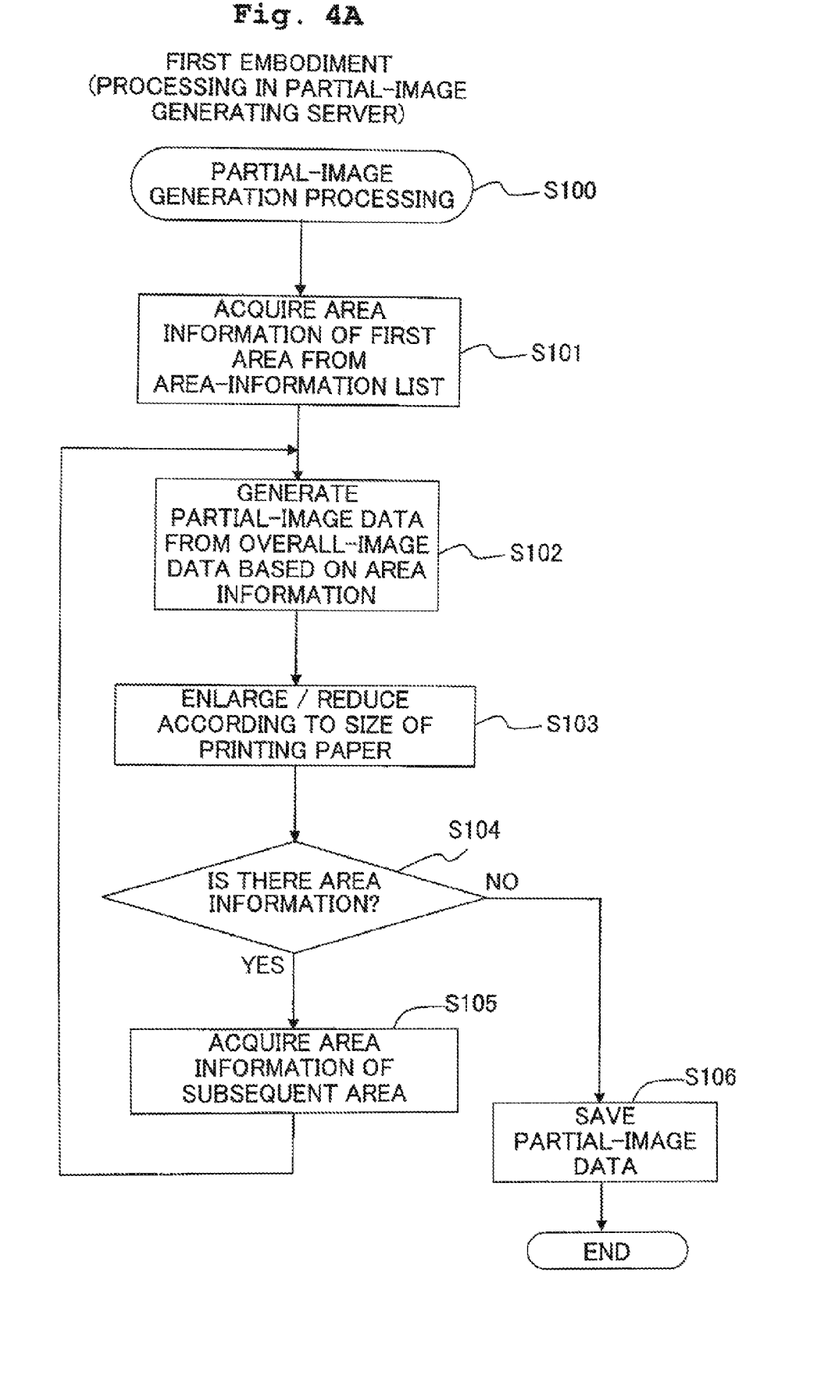
FIG. 4A is a flowchart showing a partial-image generation processing.
Figure 4B:
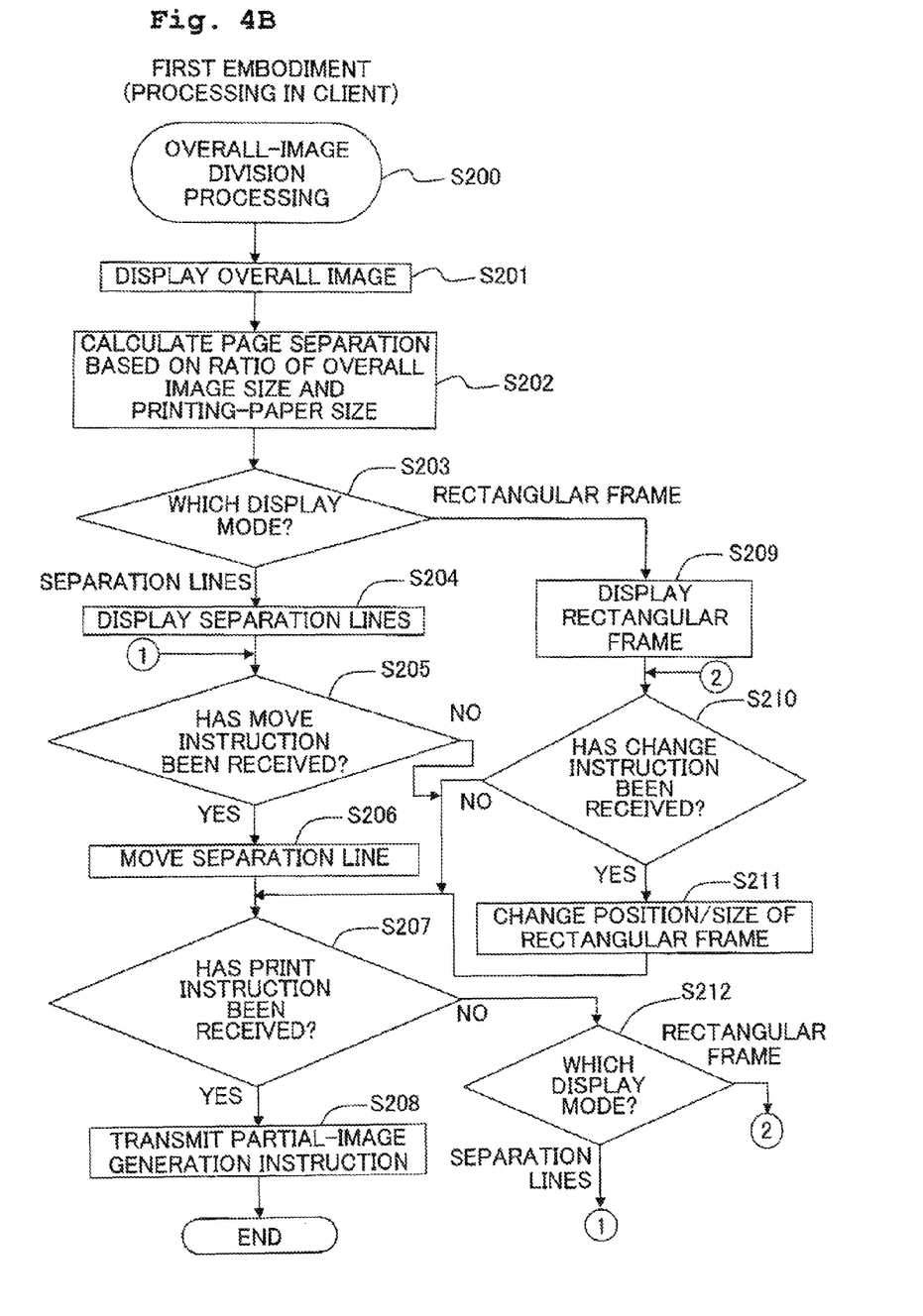
FIG. 4B is a flowchart showing an overall-image division processing.
Figure 5A:
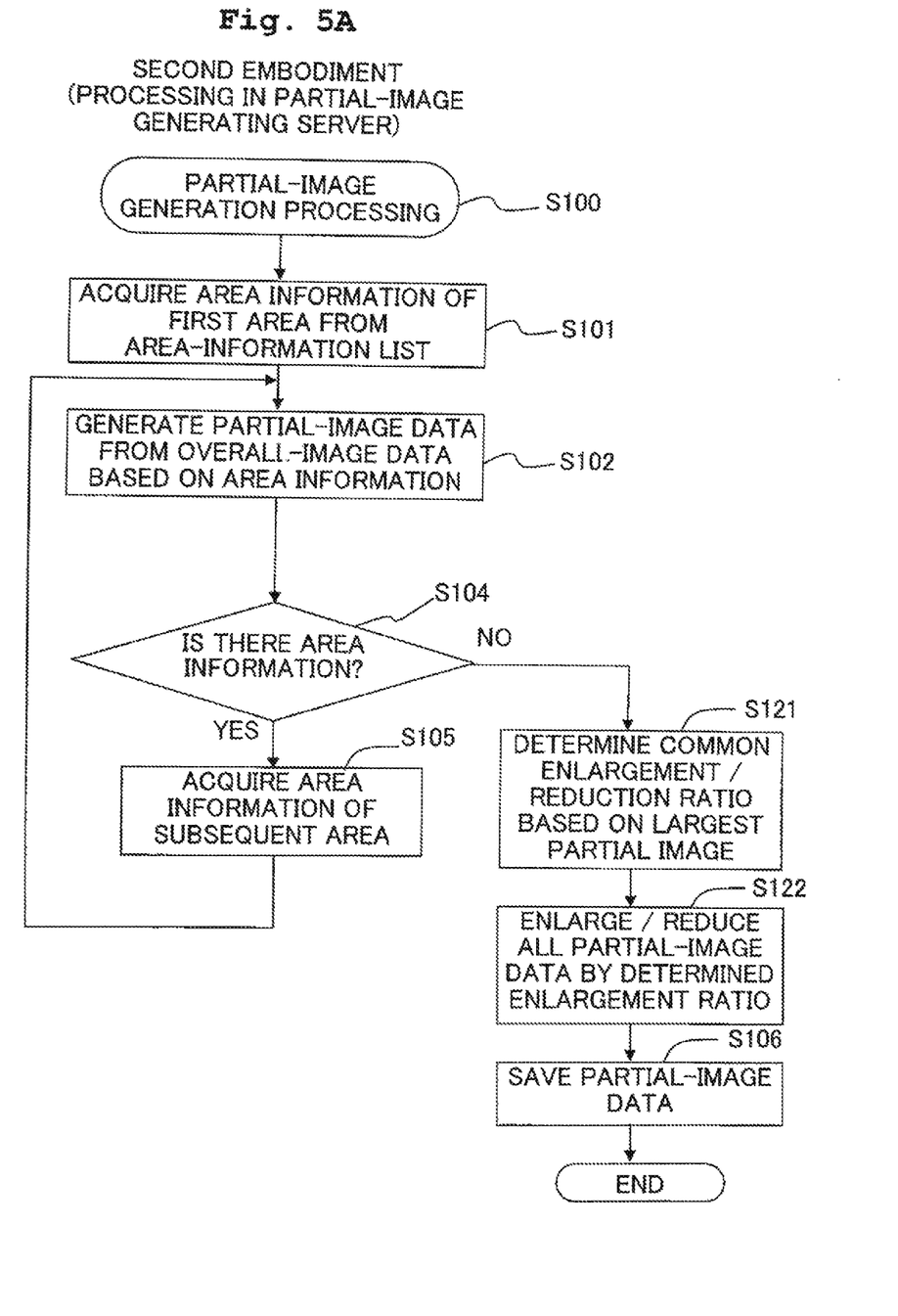
FIG. 5A is a flowchart showing a partial-image generation processing according to a second embodiment.
Figure 5B:
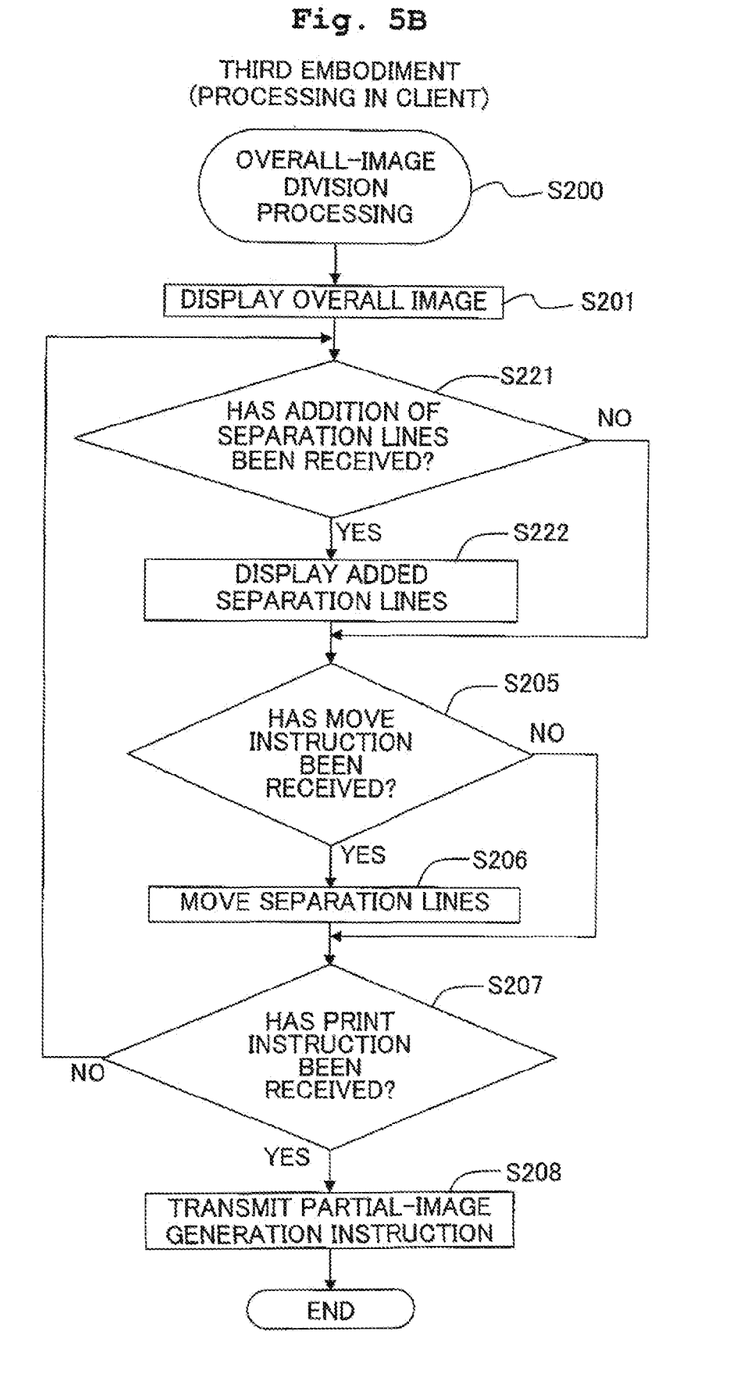
FIG. 5B is a flowchart showing an overall-image division processing according to a third embodiment.

In the embodiments described above, an arrangement has been made such that, in the partial-image generation processing in FIG. 4A and FIG. 5A, the partial-image data is enlarged or reduced according to the printing-paper size. However, an arrangement may be made such that, without enlarging or reducing the partial-image data in the image processing system, the partial-image data which the client 10 has received is enlarged or reduced according to the printing-paper size.

In the embodiments described above, an arrangement has been made such that, only the number of separation lines or the rectangular frames corresponding to the page separation which has been calculated at step S202 is displayed. However, an arrangement may be made such that, the separation lines or the rectangular frames can be added or deleted appropriately according to the user's desire. Moreover, in the embodiments described above, a rectangular area divided by the separation lines or the rectangular frames has been let to the print area. However, the area which is to be set as the print area is not restricted to the rectangular area, and it is also possible to use an area of various shapes such as a circular shape.

What is claimed is:

1. An image processing system configured to communicate with an image processing apparatus and a printing apparatus, comprising:
    a data receiving section configured to receive data in a first format from the image processing apparatus;
    a convert control section configured to control a converting section to convert the data in the first format received by the data receiving section to image data in another format which is different from the first format;
    an overall-image transmitting section configured to transmit the image data obtained by the converting section to the image processing apparatus;
    an area-information receiving section configured to receive an area information from the image processing apparatus, the area information being an information for dividing one image corresponding to the image data transmitted by the overall-image transmitting section into a plurality of pages;
    a partial-image generating section configured to generate partial-image data corresponding to a partial image obtained by dividing the one image for each of the pages, based on the area information received by the area-information receiving section; and
    a partial-image transmitting section configured to transmit one of the partial-image data and print data generated based on the partial-image data to one of the image processing apparatus and the printing apparatus.

2. The image processing system according to claim 1, wherein the image processing system includes the converting section.

3. The image processing system according to claim 1, further comprising a storage control section configured to control a storage section to store the image data obtained by the converting section being associated with identification information for identifying the image data,
    wherein the area-information receiving section is configured to receive the identification information associated with the image data together with the area information, and
    the partial-image generating section is configured to generate the partial-image data, based on the area information, from the image data stored in the storage section upon being associated with the identification information, in a case that the area information and the identification information have been received by the area-information receiving section.

4. The image processing system according to claim 3, wherein the image processing system includes the storage section.

5. The image processing system according to claim 1, further comprising a size acquiring section configured to acquire a paper size of a recording paper, on which an image is to be printed based on the data in the first format received by the data receiving section, wherein with respect to a partial image which has a size greater than the paper size acquired by the size acquiring section and which is included in the plurality of partial images corresponding to the pages respectively, the partial-image generating section is configured to generate the partial-image data corresponding to an image obtained by reducing the partial image so that the partial image is fitted into the paper size.

6. The image processing system according to claim 1, further comprising a size acquiring section configured to acquire a paper size of a recording paper, on which an image is to be printed based on the data in the first format received by the data receiving section, wherein with respect to a partial image which has a size smaller than a predetermined ratio with respect to the paper size acquired by the size acquiring section and which is included in the plurality of partial images corresponding to the pages respectively, the partial-image generating section is configured to generate the partial-image data corresponding to an image obtained by enlarging the partial image so that the partial image does not spread out of the paper size.

7. The image processing system according to claim 1, further comprising a size acquiring section configured to acquire a paper size of a recording paper, on which an image is to be printed based on the data in the first format received by the data receiving section, wherein the partial-image generating section is configured to generate the partial-image data corresponding to an image obtained by enlarging or reducing each of a plurality of partial images corresponding one of the pages by maximum enlargement ratio, by which the largest partial image among the plurality of partial images is fitted into the paper size.

8. The image processing system according to claim 1, wherein in a case that the data receiving section has received the data in the first format composed of one or more than one sheet data in which a plurality of cells are arranged in a lattice form, the converting section is configured to convert the data in the first format to image data in the another format different from the first format with respect to each of the sheet data.

9. The image processing system according to claim 1, further comprising a low-grade image generating section configured to generate image data, which has lower grade than the image data and which has a format different from the first format, based on the data in the first format received by the data receiving section, wherein the overall image transmitting section is configured to transmit the image data of the low grade generated by the low-grade image generating section to the image processing apparatus.

10. A non-transitory computer readable storage medium storing computer-executable instructions that, when executed by a processor, cause an image processing apparatus configured to communicate with an image processing system configured to convert data in a first format to image data in another format different from the first format and with a printing .apparatus, to:

transmit the data in the first format to the image processing system;

receive the image data converted from the data in the first format from the image processing system;

display one image corresponding to the image data on a display section of the image processing apparatus;

receive designation of a dividing position at which the one image displayed on the display section is divided into a plurality of pages via an operating section of the image processing apparatus;

transmit, to the image processing system, an area information which indicates an area of each of the pages obtained by dividing the one image according to the designation of the dividing position, in a case that the designation of the dividing position has been received;

receive, from the image processing system, one of partial-image data corresponding to a partial image obtained by dividing the one image based on the area information transmitted to the image processing system, and print data generated based on the partial-image data; and output, to the printing apparatus, one of the partial-image data received, print data generated from the partial image data received, and the print data received.

11. The computer readable storage medium according to claim 10, storing additional computer-executable instructions that, when executed by the processor, cause the image processing apparatus to:

display, on the display section, a dividing line for dividing one image, which corresponds to the image data and which has been displayed on the display section, into a plurality of pages based on a. predetermined paper size, by superimposing on the one image;

receive an instruction for moving the dividing line displayed on the display section from the operating section; and change a position of the dividing line based on the instruction for moving the dividing line.

12. The computer readable storage medium according to claim 11, storing additional computer-executable instructions that, when executed by the processor, cause the image processing apparatus to:

display, on the display section, the dividing line for dividing the one image into the pages by superimposing on the one image, so that a longitudinal direction of an area, which is formed by an aspect ratio of a predetermined paper size, is along a longitudinal direction of the one image which corresponds to the image data and which has been displayed on the display section.

13. The computer readable storage medium according to claim 11, storing additional computer-executable instructions that, when executed by the processor, cause the image processing apparatus to:

receive, via the operating section, an addition of a dividing line to the one image which corresponds to the image data and which has been displayed on the display section; and display, on the display section, the added dividing line by superimposing on the one image.

14. A method for image processing which is performed by an image processing system configured to communicate with an image processing apparatus and a printing apparatus, the method comprising;

receiving data in a first format from the image processing apparatus;

converting the data in the first format, which has been received, to image data in another format which is different from the first format;

transmitting the image data which has been obtained by converting the data in the first format to the image processing apparatus;

receiving, from the image processing apparatus, an area information for dividing one image corresponding to the image data transmitted to the image processing apparatus into a plurality of pages;

generating, for each of the pages, partial-image data corresponding to a partial image obtained by dividing the one image based on the area information which has been received from the image processing apparatus; and transmitting one of the partial-image data generated and print data generated based on the partial image to one of the image processing apparatus and the printing apparatus.

15. An image processing apparatus configured to communicate with an image processing system configured to convert data in a first format to image data in another format different from the first format and with a printing apparatus, the image processing apparatus comprising:

a data transmitting section configured to transmit the data in the first format to the image processing system;

an overall-image receiving section configured to receive, from the image processing system, the image data which has been converted from the data in the first format transmitted by the data transmitting section;

a display section configured to display one image corresponding to the image data which has been received by the overall-data receiving section;

a dividing-position receiving section configured to receive designation of a dividing position at which the one image displayed on the display section is divided into a plurality of pages;

an area-information transmitting section configured to transmit, to the image processing system, an area information which indicates an area of each of the pages obtained by dividing the one image according to the designation of the dividing position, in a case that the designation of the dividing position has been received by the dividing-position receiving section;

a partial-image receiving section configured to receive, from the image processing system, one of partial-image data corresponding to a partial image obtained by dividing the one image based on the area information transmitted by the area-information transmitting section, and print-data generated based on the partial-image data; and a print control section configured to output, to the printing apparatus, one of the partial-image data received by the partial-image receiving section, print data generated from the partial-image data, and the print data received by the partial-image data receiving section, and to make the printing apparatus print an image based on one of the print data and the partial-image data outputted.

* * * * *